US007610826B2

United States Patent
Endo et al.

(10) Patent No.: US 7,610,826 B2
(45) Date of Patent: Nov. 3, 2009

(54) PARALLEL AXES TYPE TRANSMISSION HAVING A PLURALITY OF IDLE DRIVE ROUTES

(75) Inventors: Masanori Endo, Tokyo (JP);
Yoshimichi Tsubata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 395 days.

(21) Appl. No.: 11/783,321

(22) Filed: Apr. 9, 2007

(65) Prior Publication Data

US 2007/0240531 A1   Oct. 18, 2007

(30) Foreign Application Priority Data

Apr. 14, 2006   (JP) .............................. 2006-111991

(51) Int. Cl.
*F16H 3/08* (2006.01)
(52) U.S. Cl. ....................................................... 74/331
(58) Field of Classification Search .................... 74/331;
*F16H 3/10*
See application file for complete search history.

(56) References Cited

U.S. PATENT DOCUMENTS 4,457,185 A * 7/1984 Yoshida et al. ............ 74/336 R 6,332,371 B1 * 12/2001 Ohashi et al. ................. 74/331
6,334,367 B1 * 1/2002 Hatakeyama et al. ......... 74/331
7,121,161 B2 * 10/2006 Hatakeyama ................. 74/359
7,181,989 B2 * 2/2007 Obinata ....................... 74/330

FOREIGN PATENT DOCUMENTS

| JP | 7-94854 B2 | 10/1995 |
| JP | 2000-220700 A | 8/2000 |
| JP | 2005-54958 A | 3/2005 |

* cited by examiner

*Primary Examiner*—Sherry L Estremsky
*Assistant Examiner*—Justin Holmes
(74) *Attorney, Agent, or Firm*—Westerman, Hattori, Daniels & Adrian, LLP

(57) ABSTRACT

A parallel axes type transmission including a first idle drive route and a second idle drive route for transmitting the relation of an input shaft to an intermediate shaft. The first idle drive route includes a one-way clutch capable of transmitting the rotation of the input shaft to the intermediate shaft only. The second idle drive route includes wet multiplate clutches for connecting gears rotatably mounted on the intermediate shaft to the intermediate shaft when engaged. Thus, the intermediate shaft is rotated at a first rotational speed through the first idle drive route and at a second rotational speed faster than the first rotational speed through the second idle drive route when the clutch is engaged.

4 Claims, 2 Drawing Sheets

PARALLEL AXES TYPE TRANSMISSION HAVING A PLURALITY OF IDLE DRIVE ROUTES

BACKGROUND OF THE INVENTION

1. Field of the Invention

The present invention relates to a parallel axes type automatic transmission having a plurality of shafts extending in parallel to each other and a plurality of gears provided on the shafts and meshing with each other, wherein the connection and disconnection between each shaft and the gears provided thereon are made to thereby switch between power transmitting routes formed between the shafts, thereby obtaining a desired gear ratio.

2. Description of the Related Art

Such a parallel axes type transmission is used not only in a vehicle, but also in various power machines. In such a transmission for a vehicle, the number of shift steps tends to be increased to meet the requirements for a vehicle driving performance and effects on the environment, and a transmission having five or more forward speeds has already been put into practical use. Generally in a transmission not limited to a transmission for a vehicle, the number of gears provided on each shaft increases with an increase in number of shift steps, so that the overall size of the transmission, particularly the axial size thereof tends to increase. A transmission is required to be installed in a certain space defined in a machine using this transmission. Accordingly, in the case that the number of shift steps increases to cause an increase in axial size of the transmission, it is necessary to make the transmission compact by adopting any means. Particularly in a vehicle transmission limited in various sizes from the viewpoint of the size of a vehicle body, making the transmission compact is a very important issue.

Various inventions have conventionally made to reduce the axial size of a parallel axes type transmission. For example, an intermediate shaft is interposed between an input shaft and an output shaft, and the intermediate shaft is driven through gears by the input shaft, whereby the number of gears provided on each shaft is reduced to thereby reduce the axial size of the transmission (see Japanese Patent Laid-open No. 2000-220700, for example). Further, in addition to the above configuration, it is known that the gear provided on the output shaft and meshing with the gear provided on the input shaft is the same as the gear provided on the output shaft and meshing with the gear provided on the intermediate shaft (see Japanese Patent Publication No. Hei 7-94854, for example).

In this configuration, the gears provided on the output shaft for providing two different gear ratios are provided by a common gear. As a result, the number of gears provided on the output shaft can be reduced, and the gears provided on the input shaft and the intermediate shaft and meshing with the common gear provided on the output shaft can be arranged in substantially the same plane. As a result, the axial size of the transmission can be greatly reduced. Further, as disclosed in Japanese Patent Laid-open No. 2005-54958, it is known in the art that an idle gear train is used to drive the intermediate shaft and that the number of shift steps can be increased and the axial size can be reduced by increasing the number of intermediate shafts with the use of idle gear trains.

However, in the configuration described in Japanese Patent Publication No. Hei 7-94854 wherein the common gear for two different gear ratios is provided on the output shaft, there is a case that the effect of reducing the axial size is insufficient in a recent transmission having a tendency to increase the number of shift steps, and it is therefore desired to provide a configuration which can reduce the axial size more greatly. Further, the parallel axes type transmission described in Japanese Patent Laid-open No. 2005-54958 has a compact structure with a reduced axial size for the number of shift steps. However, it is necessary to provide a plurality of wet multiplate clutches whose number is equal to the number of shift steps, causing a somewhat complicated configuration.

SUMMARY OF THE INVENTION

It is therefore an object of the present invention to provide a parallel axes type transmission which can be reduced in axial size for the number of shift steps and can provide an increased number of shift, steps greater than the number of clutches.

In accordance with an aspect of the present invention, there is provided a parallel axes type transmission including an input shaft, an intermediate shaft, an idle shaft, and an output shaft extending in parallel to each other; a common gear fixed to the input shaft; a first intermediate gear idly rotatably provided on the intermediate shaft; a second intermediate gear fixed through a one-way clutch to the intermediate shaft; a third intermediate gear idly rotatably provided on the intermediate shaft; a fourth intermediate gear idly rotatably provided on the intermediate shaft; a first idle gear provided on the idle shaft and meshing with the common gear and the second intermediate gear; a second idle gear idly rotatably provided on the output shaft and meshing with the common gear and the first intermediate gear; a first output gear fixed to the output shaft and meshing with the third intermediate gear; a second output gear fixed to the output shaft and meshing with the fourth intermediate gear; a first clutch for making the connection and disconnection between the first intermediate gear and the intermediate shaft; a second clutch for making the connection and disconnection between the third intermediate gear and the intermediate shaft; and a third clutch for making the connection and disconnection between the fourth intermediate gear and the intermediate shaft, wherein a first idle drive route is formed by the common gear, the first idle gear, the second intermediate gear, and the one-way clutch, a second idle drive route is formed by the common gear, the second idle gear, the first intermediate gear, and the first clutch, and when the first clutch is engaged to connect the first intermediate gear to the intermediate shaft, slippage occurs in the one-way clutch to cut off the drive through the first idle drive route.

With this arrangement, the output through the intermediate shaft can be made double or more, so that an increase in axial size of the transmission can be suppressed in spite of an increase in number of shift steps. Further, the number of shift steps can be increased without increasing the number of intermediate shafts and/or clutches, so that the complication in structure of the transmission can be prevented. Further, in the case that the number of shift steps is fixed, the number of clutches and gears can be reduced and the axial size of the transmission can accordingly be reduced. Accordingly, the transmission of the present invention is effective particularly when applied to a front-drive vehicle having a transversely mounted transmission.

Preferably, the parallel axes type transmission further includes a first input gear rotatably provided on the input shaft and meshing with the first output gear; a second input gear rotatably provided on the input shaft and meshing with the second output gear; a fourth clutch for making the connection and disconnection between the first input gear and the input shaft; and a fifth clutch for making the connection and disconnection between the second input gear and the input shaft.

More preferably, the parallel axes type transmission further includes a second intermediate shaft extending in parallel to the input shaft; a fifth intermediate gear idly rotatably provided on the second intermediate shaft and meshing with the common gear; a sixth intermediate gear idly rotatably provided on the second intermediate shaft and meshing with the first input shaft; a reverse drive gear idly rotatably provided on the second intermediate shaft; and a selective clutch fixed in the rotational direction of the second intermediate shaft and axially slidably provided on the second intermediate shaft for selectively connecting any one of the sixth intermediate gear and the reverse drive gear to the second intermediate shaft.

More preferably, the parallel axes type transmission further includes a second idle shaft extending in parallel to the input shaft; and an idle driven gear fixed to the second idle shaft and meshing with the reverse drive gear and the second input gear.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
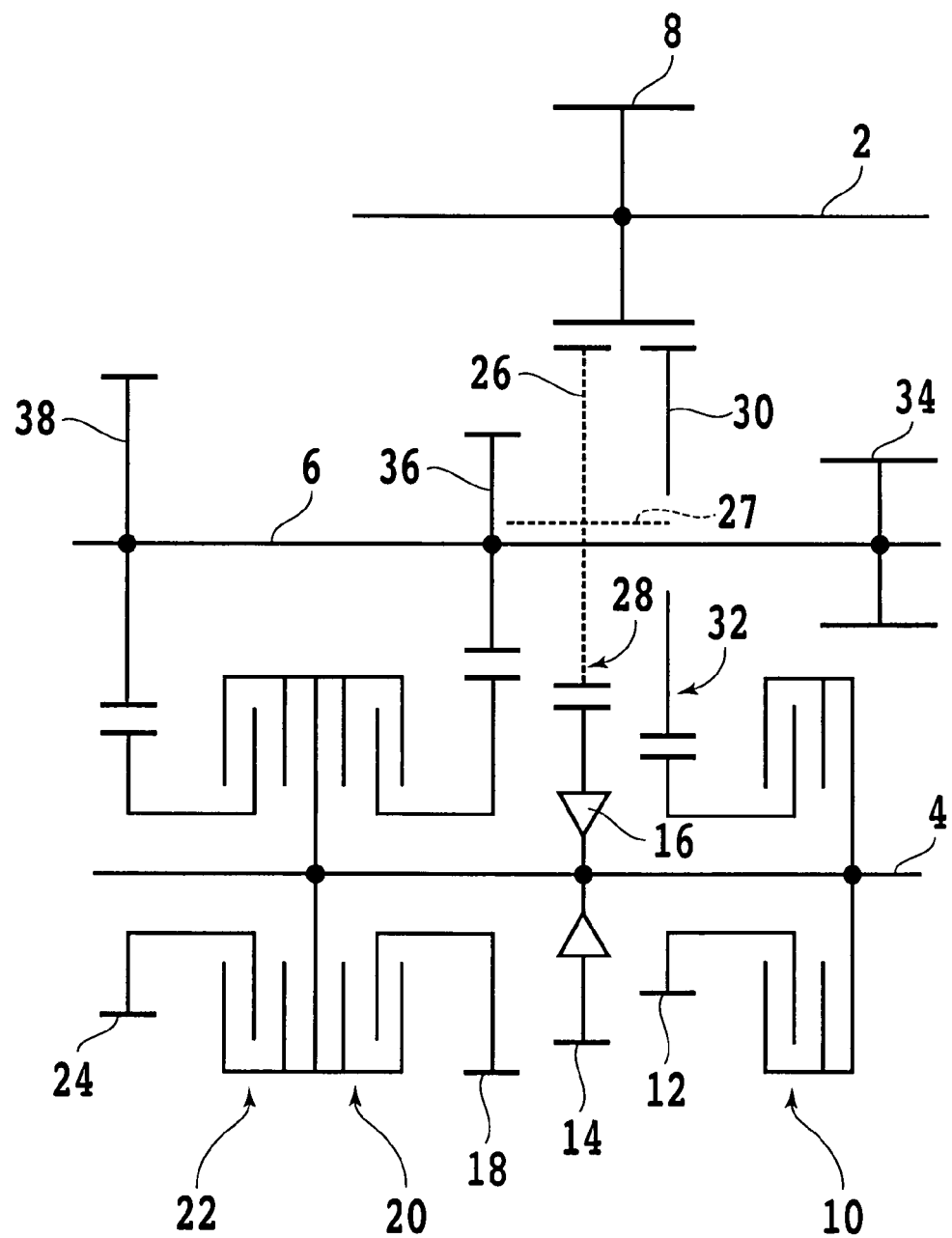
FIG. 1 is a skeleton diagram showing the configuration of a parallel axes type automatic transmission according to a first preferred embodiment of the present invention.

Some preferred embodiments of the present invention will now be described with reference to the drawings. FIG. 1 shows a first preferred embodiment of the parallel axes type automatic transmission (which will be hereinafter referred to simply as transmission) according to the present invention. The transmission according to the first preferred embodiment has an input shaft 2, an intermediate shaft 4, and an output shaft 6 extending in parallel to each other. The input shaft 2 is connected to the crankshaft of an engine (not shown), so that the input shaft 2 is rotationally driven by the engine. A common gear 8 is fixed to the input shaft 2. There are provided on the intermediate shaft 4 a first clutch 10, a first intermediate gear 12, a second intermediate gear 14, a third intermediate gear 18, a second clutch 20, a third clutch 22, and a fourth intermediate gear 24. These elements 10, 12, 14, 18, 20, 22, and 24 are arranged in this order in the axial direction of the intermediate shaft 4 from the right end thereof as viewed in FIG. 1.

The first intermediate gear 12, the third intermediate gear 18, and the fourth intermediate gear 24 are idly rotatable relative to the intermediate shaft 4, and the second intermediate gear 14 is mounted through a one-way clutch 16 to the intermediate shaft 4. More specifically, the second intermediate gear 14 is mounted on the outer race of the one-way clutch 16, and the inner race of the one-way clutch 16 is fixed to the intermediate shaft 4. Accordingly, torque is allowed to be transmitted from the second intermediate gear 14 through the one-way clutch 16 to the intermediate shaft 4, but disallowed to be transmitted from the intermediate shaft 4 to the second intermediate gear 14 because of the slippage in the one-way clutch 16. Each of the first, second, and third clutches 10, 20, and 22 is a hydraulic piston type wet multi-plate clutch generally known in the art, and the description thereof will therefore be omitted herein.

There are provided on the output shaft 6 a final drive gear 34, a second idle gear 30, a first output gear 36, and a second output gear 38. These elements 34, 30, 36, and 38 are arranged in this order in the axial direction of the output shaft 6 from the right end thereof as viewed in FIG. 1. The final drive gear 34, the first output gear 36, and the second output gear 38 are fixed to the output shaft 6, and the second idle gear 30 is idly rotatable relative to the output shaft 6. The second idle gear 30 is in mesh with the common gear 8 and the first intermediate gear 12. The first output gear 36 is in mesh with the third intermediate gear 18, and the second output gear 38 is in mesh with the fourth intermediate gear 24. Further, the final drive gear 34 is in mesh with a final driven gear (not shown).

Reference numeral 26 denotes a first idle gear, which is fixed to an idle shaft 27 rotatably provided. Alternatively, the idle shaft 27 may be fixed and the first idle gear 26 may be idly rotatable relative to the idle shaft 27. The first idle gear 26 is in mesh with the common gear 8 and the second intermediate gear 14. A first idle drive route 28 for providing lower gear ratios is formed by the common gear 8, the first idle gear 26, the second intermediate gear 14, and the one-way clutch 16, and a second idle drive route 32 for providing higher gear ratios is formed by the common gear 8, the second idle gear 30, the first intermediate gear 12, and the first clutch 10.

The operation of the first preferred embodiment will now be described. When the first clutch 10 is in a disengaged condition, the first intermediate gear 12 idly rotates relative to the intermediate shaft 4, so that the rotation of the input shaft 2 is not transmitted through the second idle drive route 32 to the intermediate shaft 4. In this case, the rotation of the input shaft 2 is transmitted through the first idle drive route 28 composed of the common gear 8, the first idle gear 26, the second intermediate gear 14, and the one-way clutch 16 to the intermediate shaft 4, and the intermediate shaft 4 is rotated at a first rotational speed.

Accordingly, when the third clutch 22 is engaged, the fourth intermediate gear 24 is fixed to the intermediate shaft 4, and the output shaft 6 is rotated at a rotational speed corresponding to a first forward speed through the second output gear 38. On the other hand, when the third clutch 22 is disengaged and the second clutch 20 is engaged, the third intermediate gear 18 is fixed to the intermediate shaft 4. As a result, the output shaft 6 is rotated at a rotational speed corresponding to a second forward speed through the first output gear 36.

On the other hand, when the first clutch 10 is engaged, the first intermediate gear 12 is fixed to the intermediate shaft 4. Accordingly, the rotation of the input shaft 2 is transmitted not only through the first idle drive route 28, but also through the second idle drive route 32 composed of the common gear 8, the second idle gear 30, the first intermediate gear 12, and the first clutch 10 to the intermediate shaft 4, so that the intermediate shaft 4 is rotated at a second rotational speed higher than the first rotational speed. At this time, the rotation of the intermediate shaft 4 at the second rotational speed is not transmitted to the first idle gear 26 because of the slippage in the one-way clutch 16 interposed between the second intermediate gear 14 and the intermediate shaft 4.

Accordingly, when the third clutch 22 is engaged, the fourth intermediate gear 24 is fixed to the intermediate shaft 4, and the output shaft 6 is rotated at a rotational speed corresponding to a third forward speed. Further, when the third clutch 22 is disengaged and the second clutch 20 is engaged, the third intermediate gear 18 is fixed to the intermediate shaft 4, and the output shaft 6 is rotated at a rotational speed corresponding to a fourth forward speed. In this preferred embodiment, the first forward speed and the second forward speed are provided through the first idle drive route 28, and the third forward speed and the fourth forward speed are provided through the second idle drive route 32. However, depending upon the gear ratios of the first and second idle drive routes 28 and 32, there is a case that the second forward speed may be provided through the second idle drive route 32 and the third forward speed may be provided through the first idle drive route 28.

There will now be described a second preferred embodiment of the parallel axes type automatic transmission according to the present invention with reference to FIG. 2. The transmission according to the second preferred embodiment is an automatic transmission having seven forward speeds and one reverse speed as constructed by applying the principle of the present invention. The transmission according to the second preferred embodiment has an input shaft 42, a first intermediate shaft 44, a second intermediate shaft 46, and an output shaft 48 extending in parallel to each other. These elements 42, 44, 46, and 48 are rotatably supported by bearings.

The input shaft 42 is connected to the crankshaft of an engine (not shown), so that the input shaft 42 is rotationally driven by the engine. There are provided on the input shaft 42 a common gear 50, a first input gear 52, a first clutch 54, a second clutch 56, and a second input gear 58. These elements 50, 52, 54, 56, and 58 are arranged in this order in the axial direction of the input shaft 42 from the right end thereof as viewed in FIG. 2. The common gear 50 is fixed to the input shaft 42. The first input gear 52 and the second input gear 58 are idly rotatable relative to the input shaft 42. Each of the first and second clutches 54 and 56 is a hydraulic piston type wet multiplate clutch generally known in the art, and the description thereof will therefore be omitted herein.

There are provided on the first intermediate shaft 44 a third clutch 60, a first intermediate gear 62, a second intermediate gear 64, a third intermediate gear 68, a fourth clutch 70, a fifth clutch 72, and a fourth intermediate gear 74. These elements 60, 62, 64, 68, 70, 72, and 74 are arranged in this order in the axial direction of the first intermediate shaft 44 from the right end thereof as viewed in FIG. 2. The second intermediate gear 64 is mounted through a one-way clutch 66 to the first intermediate shaft 44. More specifically, the second intermediate gear 64 is fixed to the outer race of the one-way clutch 66, and the inner race of the one-way clutch 66 is fixed to the first intermediate shaft 44. Accordingly, torque is allowed to be transmitted from the second intermediate gear 64 through the one-way clutch 66 to the first intermediate shaft 44, but disallowed to be transmitted from the first intermediate shaft 44 to the second intermediate gear 64 because of the slippage in the one-way clutch 66.

The first intermediate gear 62, the third intermediate gear 68, and the fourth intermediate gear 74 are idly rotatable relative to the first intermediate shaft 44. Each of the third, fourth, and fifth clutches 60, 70, and 72 is a hydraulic piston type wet multiplate clutch generally known in the art, and the description thereof will therefore be omitted herein.

There are provided on the second intermediate shaft 46 a sixth clutch 84, a fifth intermediate gear 86, a sixth intermediate gear 88, a selective clutch 90, and a reverse drive gear 92. These elements 84, 86, 88, 90, and 92 are arranged in this order in the axial direction of the second intermediate shaft 46 from the right end thereof as viewed in FIG. 2. The fifth intermediate gear 86 and the sixth intermediate gear 88 are idly rotatable relative to the second intermediate shaft 46. The fifth intermediate gear 86 is in mesh with the common gear 50, and the sixth intermediate gear 88 is in mesh with the first input gear 52. The reverse drive gear 92 is in mesh with an idle driven gear 102 fixed to an idle shaft 100 rotatably provided. The idle driven gear 102 is in mesh with the second input gear 58.

The selective clutch 90 is axially slidably provided on the second intermediate shaft 46. When the selective clutch 90 is moved rightward as viewed in FIG. 2, the second intermediate gear 88 is connected through the selective clutch 90 to the second intermediate shaft 46, whereas when the selective clutch 90 is moved leftward as viewed in FIG. 2, the reverse drive gear 92 is connected through the selective clutch 90 to the second intermediate shaft 46. The sixth clutch 84 is a hydraulic piston type wet multiplate clutch generally known in the art, and the description thereof will therefore be omitted herein.

There are provided on the output shaft 48 a final drive gear 94, a second idle gear 80, a first output gear 96, and a second output gear 98. These elements 94, 80, 96, and 98 are arranged in this order in the axial direction of the output shaft 48 from the right end thereof as viewed in FIG. 2. The final drive gear 94, the first output gear 96, and the second output gear 98 are fixed to the output shaft 48, and the second idle gear 80 is idly rotatable relative to the output shaft 48. The second idle gear 80 is in mesh with the common gear 50 and the first intermediate gear 62. The first output gear 96 is in mesh with the first input gear 52 and the third intermediate gear 68. The second output gear 98 is in mesh with the second input gear 58 and the fourth intermediate gear 74. The final drive gear 94 is in mesh with a final driven gear (not shown).

Reference numeral 76 denotes a first idle gear, which is fixed to an idle shaft 77 rotatably provided. Alternatively, the idle shaft 77 may be fixed and the first idle gear 76 may be idly rotatable relative to the idle shaft 77. The first idle gear 76 is in mesh with the common gear 50 and the second intermediate gear 64. A first idle drive route 78 for providing lower gear ratios is formed by the common gear 50, the first idle gear 76, the second intermediate gear 64, and the one-way clutch 66, and a second idle drive route 82 for providing higher gear ratios is formed by the common gear 50, the second idle gear 80, the first intermediate gear 62, and the first clutch 60.

The operation of the second preferred embodiment will now be described. When the third clutch 60 is in a disengaged condition, the rotation of the input shaft 42 is transmitted through the first idle drive route 78 composed of the common gear 50, the first idle gear 76, the second intermediate gear 64, and the one-way clutch 66 to the first intermediate shaft 44. Accordingly, when the fifth clutch 72 is engaged, the rotation of the first intermediate shaft 44 is transmitted through the fourth intermediate gear 74 and the second output gear 98 to the output shaft 48, and the output shaft 48 is rotated at a rotational speed corresponding to a first forward speed.

When the fifth clutch 72 is disengaged and the fourth clutch 70 is engaged, the rotation of the first intermediate shaft 44 is transmitted through the third intermediate gear 68 and the first output gear 96 to the output shaft 48, and the output shaft 48 is rotated at a rotational speed corresponding to a second forward speed. When the third clutch 60 is engaged, the rotation of the input shaft 42 is transmitted through the second idle drive route 82 composed of the common gear 50, the second idle gear 80, the first intermediate gear 62, and the third clutch 60 to the first intermediate shaft 44.

In this case, the first intermediate shaft 44 is rotated at a speed higher than that of rotation through the first idle drive route 78. Accordingly, the slippage in the one-way clutch 66 occurs and the high-speed rotation of the first intermediate shaft 44 through the second idle drive route 82 does not have an effect on the first idle drive route 78. Accordingly, when the fifth clutch 72 is engaged simultaneously with engagement of the third clutch 60, the rotation of the first intermediate shaft 44 is transmitted through the fourth intermediate gear 74 and the second output gear 98 to the output shaft 48, and the output shaft 48 is rotated at a rotational speed corresponding to a third forward speed.

On the other hand, when the fourth clutch 70 is engaged simultaneously with engagement of the third clutch 60, the rotation of the first intermediate shaft 44 is transmitted through the third intermediate gear 68 and the first output gear 96 to the output shaft 48, and the output shaft 48 is rotated at a rotational speed corresponding to a fourth forward speed. When the sixth clutch 84 is engaged and the selective clutch 90 is moved rightward as viewed in FIG. 2 to connect the sixth intermediate gear 88 to the second intermediate shaft 46, the rotation of the input shaft 42 is transmitted through the common gear 50 and the fifth intermediate gear 86 to the second intermediate shaft 46, and the rotation of the second intermediate shaft 46 is transmitted through the selective clutch 90, the sixth intermediate gear 88, the first input gear 52, and the first output gear 96 to the output shaft 48. Thus, the output shaft 48 is rotated at a rotational speed corresponding to a fifth forward speed.

When the second clutch 56 is engaged, the rotation of the input shaft 42 is transmitted through the second input gear 58 and the second output gear 98 to the output shaft 48, and the output shaft 48 is rotated at a rotational speed corresponding to a sixth forward speed. Finally, when the first clutch 54 is engaged, the rotation of the input shaft 42 is transmitted through the first input gear 52 and the first output gear 96 to the output shaft 48, and the output shaft 48 is rotated at a rotational speed corresponding to a seventh forward speed.

Figure 2:
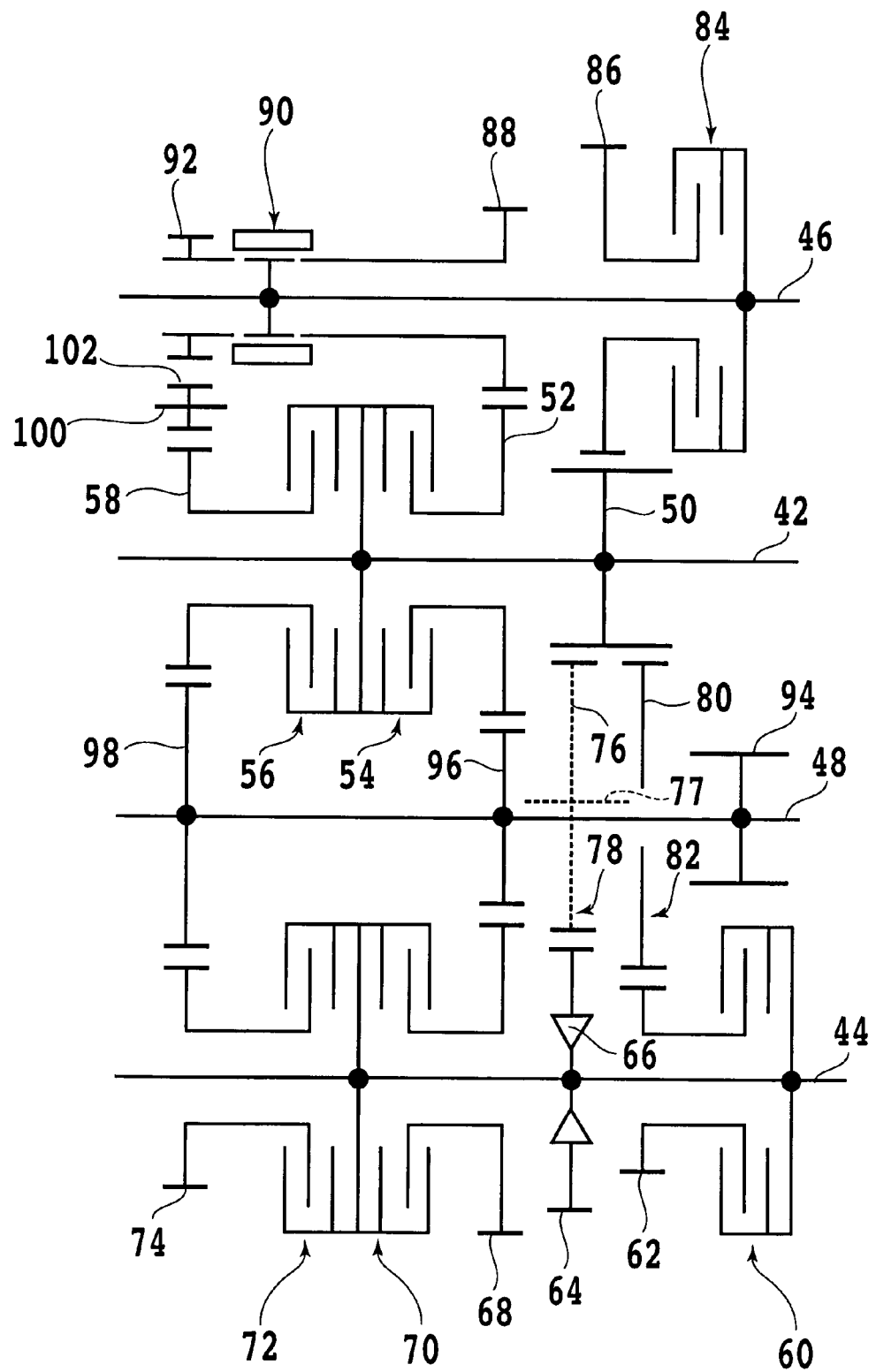
FIG. 2 is a skeleton diagram showing the configuration of a parallel axes type automatic transmission according to a second preferred embodiment of the present invention.

In the case of reverse running, the sixth clutch 84 is engaged and the selective clutch 90 is moved leftward as viewed in FIG. 2. As a result, the rotation of the input shaft 42 is transmitted through the common gear 50 and the fifth intermediate gear 86 to the second intermediate shaft 46, and the rotation of the second intermediate shaft 46 is transmitted through the selective clutch 90, the reverse drive gear 92, the reverse driven gear 102, the second input gear 58, and the second output gear 98 to the output shaft 48, and the output shaft 48 is rotated in a reverse direction.

According to the second preferred embodiment, it is possible to provide a parallel axes type automatic transmission having seven forward speeds by using six wet multiplate clutches. Thus, the number of wet multiplate clutches can be reduced to thereby achieve the simplification of a transmission structure and the reduction in axial size of the transmission. Further, since the one-way clutch 66 is less expensive than a wet multiplate clutch, the transmission according to this preferred embodiment can be reduced in cost as compared with a transmission using a plurality of wet multiplate clutches whose number corresponds to the number of shift steps (forward speeds).

It should be noted that the description on the first to seventh forward speeds mentioned above in the second preferred embodiment is merely illustrative and the first to seventh forward speeds may be provided through any other transmission routes depending upon the gear ratios of the first idle drive route 78 and the second idle drive route 82.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A parallel axes type transmission comprising:

an input shaft, an intermediate shaft, an idle shaft, and an output shaft extending in parallel to each other;

a common gear fixed to said input shaft;

a first intermediate gear idly rotatably provided on said intermediate shaft;

a second intermediate gear fixed through a one-way clutch to said intermediate shaft;

a third intermediate gear idly rotatably provided on said intermediate shaft;

a fourth intermediate gear idly rotatably provided on said intermediate shaft;

a first idle gear provided on said idle shaft and meshing with said common gear and said second intermediate gear;

a second idle gear idly rotatably provided on said output shaft and meshing with said common gear and said first intermediate gear;

a first output gear fixed to said output shaft and meshing with said third intermediate gear;

a second output gear fixed to said output shaft and meshing with said fourth intermediate gear;

a first clutch for making the connection and disconnection between said first intermediate gear and said intermediate shaft;

a second clutch for making the connection and disconnection between said third intermediate gear and said intermediate shaft; and a third clutch for making the connection and disconnection between said fourth intermediate gear and said intermediate shaft, wherein a first idle drive route is formed by said common gear, said first idle gear, said second intermediate gear, and said one-way clutch, a second idle drive route is formed by said common gear, said second idle gear, said first intermediate gear, and said first clutch, and when said first clutch is engaged to connect said first intermediate gear to said intermediate shaft, slippage occurs in said one-way clutch to cut off the drive through said first idle drive route.

2. The parallel axes type transmission according to claim 1, further comprising:

a first input gear rotatably provided on said input shaft and meshing with said first output gear;

a second input gear rotatably provided on said input shaft and meshing with said second output gear;

a fourth clutch for making the connection and disconnection between said first input gear and said input shaft; and a fifth clutch for making the connection and disconnection between said second input gear and said input shaft.

3. The parallel axes type transmission according to claim 2, further comprising:

a second intermediate shaft extending in parallel to said input shaft;

a fifth intermediate gear idly rotatably provided on said second intermediate shaft and meshing with said common gear;

a sixth intermediate gear idly rotatably provided on said second intermediate shaft and meshing with said first input shaft;

a reverse drive gear idly rotatably provided on said second intermediate shaft; and a selective clutch fixed in the rotational direction of said second intermediate shaft and axially slidably provided on said second intermediate shaft for selectively connecting any one of said sixth intermediate gear and said reverse drive gear to said second intermediate shaft.

4. The parallel axes type transmission according to claim 3, further comprising:

a second idle shaft extending in parallel to said input shaft; and an idle driven gear fixed to said second idle shaft and meshing with said reverse drive gear and said second input gear.

* * * * *